United States Patent  [15] 3,656,103
Tanaka et al.  [45] Apr. 11, 1972

[54] VEHICLE'S DIRECTION INDICATING LAMP AND BRAKE LAMP FOR COMBINATION USE

[72] Inventors: Hiroshi Tanaka, Motosu-gun; Shozo Naito, Ama-gun; Tetsuji Shimizu, Nagoya, all of Japan

[73] Assignee: Kabushiki Kaisha Tokai Rika Denki Seisakusho, Nishibiwajima-cho, Nishikasu-gai-gun, Aichi-Perfecture, Japan

[22] Filed: Mar. 18, 1969

[21] Appl. No.: 808,235

[52] U.S. Cl. ...........................340/67, 307/223, 307/293, 315/77, 340/82
[51] Int. Cl. ..................................................B60q 1/38
[58] Field of Search................................................340/67.82

[56] References Cited

UNITED STATES PATENTS 3,474,410  10/1969  Ivec.........................................340/82
3,500,312  3/1970  Stankovich..............................340/67
3,504,338  3/1970  Breece..................................340/82 X Primary Examiner—John W. Caldwell
Assistant Examiner—Kenneth N. Leimer
Attorney—McGlew and Toren

[57] ABSTRACT

A signalling system for an automobile operates a plurality of lamps on the rear of a vehicle either simultaneously or sequentially. It responds to a brake signal appearing on one line and a direction signal appearing on another line. The system is composed of a plurality of bistable circuits each connected to one lamp and receiving its input signal from the adjacent bistable circuit. The brake signal turns on the first bistable circuit which immediately turns on the others in sequence. Thus the lamps are lit simultaneously. The direction indicating signal turns on the first bistable circuit to light the first lamp but also incorporates a time delay into the couplings between the adjacent bistable circuits. Thus the lamps are turned on sequentially. The indicator signal also turns on a transistor that cuts off any brake signal that may occur during a direction indicating signal.

9 Claims, 3 Drawing Figures

INVENTORS
HIROSHI TANAKA
SHOZO NAITO
TETSUJI SHIMIZU

BY Maylward Toren
ATTORNEYS

VEHICLE'S DIRECTION INDICATING LAMP AND BRAKE LAMP FOR COMBINATION USE

This invention relates to semiconductor circuits for controlling the direction indicating lamps and the brake lamps of vehicles, such as automobiles.

An object of this invention is to provide a circuit which uses the same lamps of vehicles, applying the desired lamps as brake lamps as well as direction indicating lamps.

Another object of this invention is to provide a circuit in which the direction indication, i.e., flashing, takes preference over the brake signals when both brake signals and direction indicating signals are applied simultaneously.

Another object of this invention is to accomplish the above using semi-conductor elements without contacts and achieve reliable performance, long life and simple circuit composition.

Figure 1:
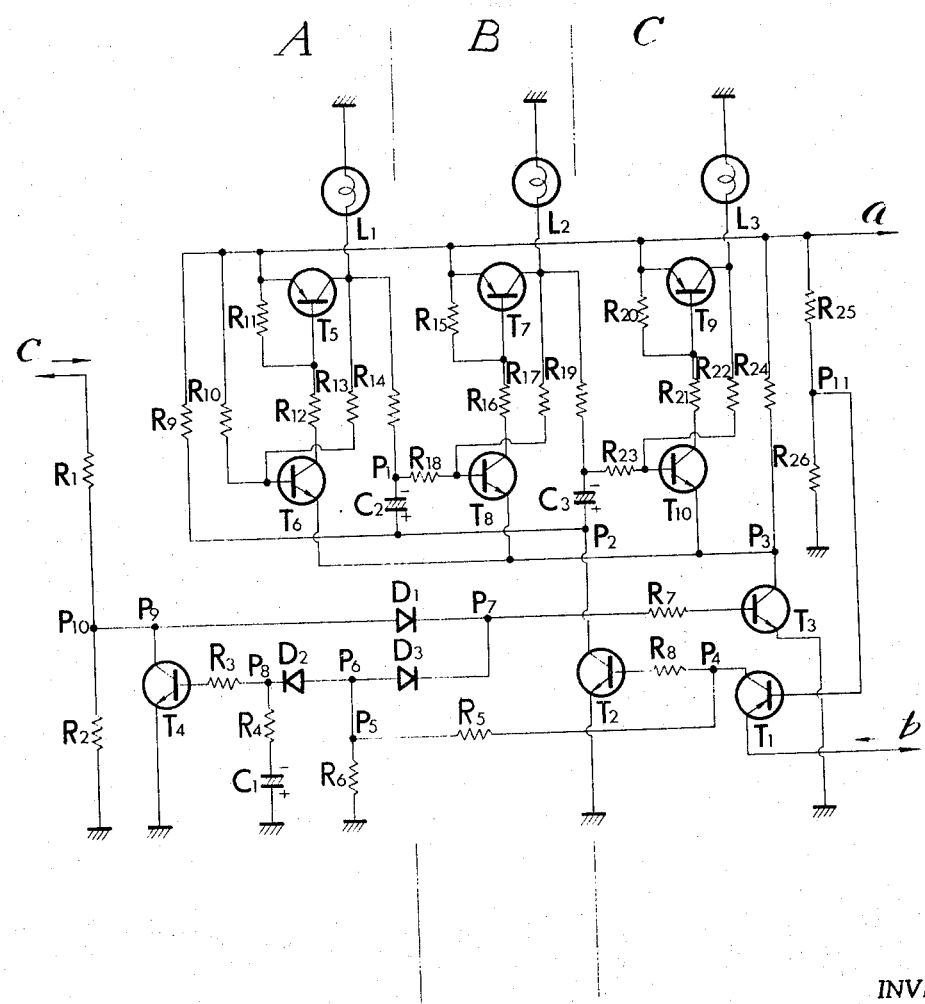
Figure 2:
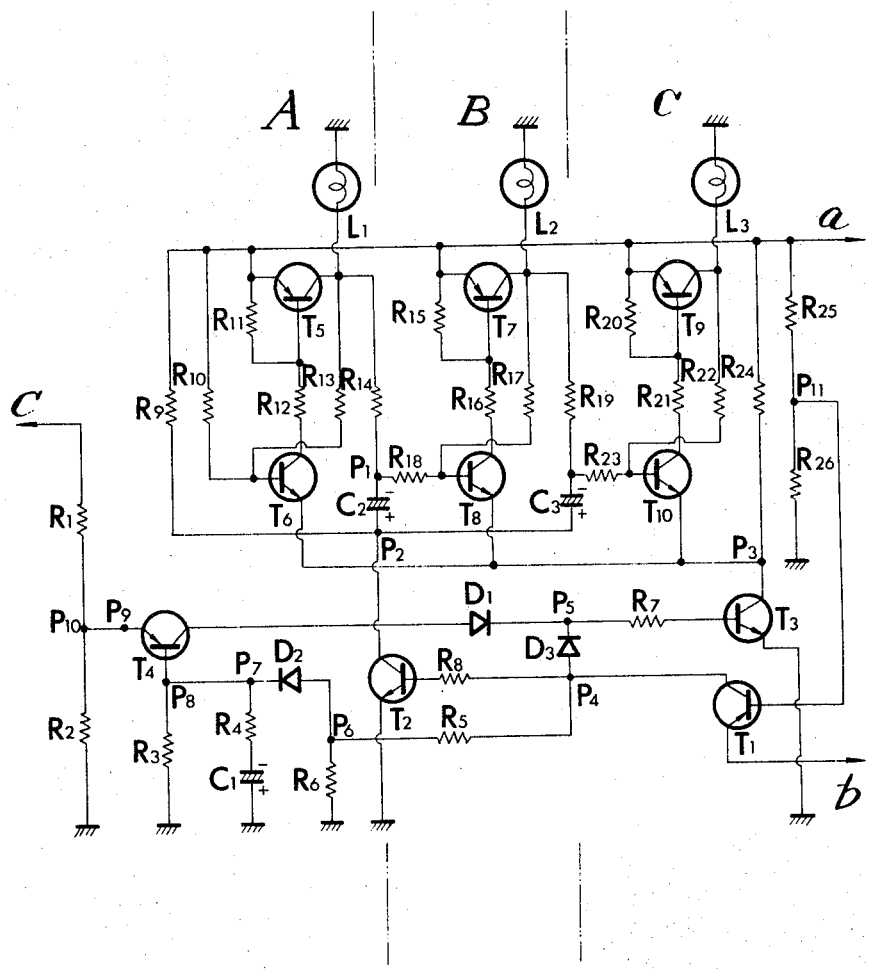
Figure 3:
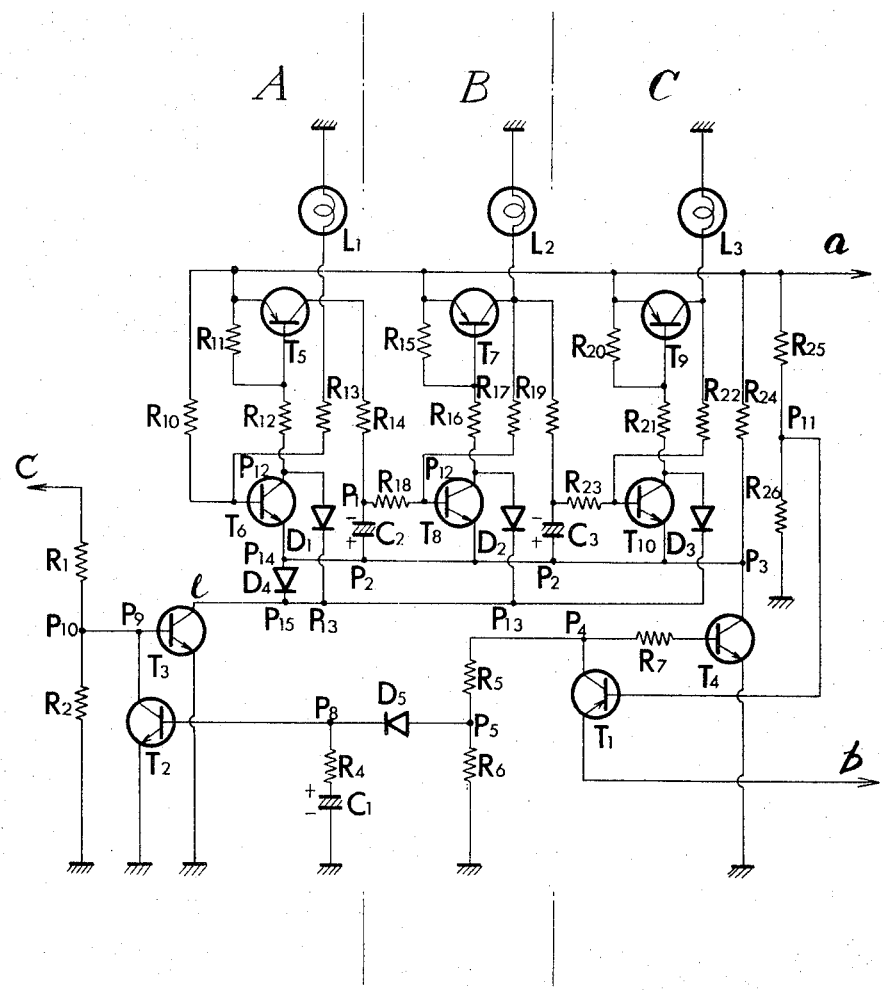

FIG. 1, FIG. 2 and FIG. 3 are the drawings showing the three embodiments of the vehicle's direction indicating lamp and brake lamp for combination use according to this invention.

In the preferred embodiment shown, three lamps $L_1$, $L_2$ and $L_3$ form a group used as both the brake lights and the direction indicators on one side such as the left side of a vehicle body. An identical group of lamps similarly form the brake lights and direction indicators on the other side, the right side, of the body. Thus there is a pair of groups on the body.

The circuit shown energizes the left side lamps or the right side lamps. An identical circuit energizes the lamp on the other side and is omitted from the drawings.

In the circuit shown, the signal from the direction indicator is provided intermittently from the terminal $b$. The said signal is provided by electrical means using conventional bimetal devices or mechanical cam mechanism, etc.

The brake signal generated by pressing the brake is provided at the terminal $c$. The brake signal is passed through a conventional interlock switch in the brake line of the vehicle.

Referring now to FIG. 1, a power supply terminal $a$ is connected the positive pole of the energizing source such as a battery (not shown). The terminal $a$ is connected to the emitters of three transistors $T_5$, $T_7$ and $T_9$ in three circuit stages A, B and C. The base of each transistor $T_5$, $T_7$ and $T_9$ is connected through one of respective resistors $R_{12}$, $R_{16}$ and $R_{21}$ to the collectors of one of three transistors $T_6$, $T_8$ and $T_{10}$. The collectors of transistors $T_5$, $T_7$ and $T_9$ are in turn connected through the resistors $R_{13}$, $R_{17}$ and $R_{22}$ to the bases of transistors $T_6$, $T_8$ and $T_{10}$. A resistor $R_{10}$ connects the base of the transistor $T_6$ in the first stage A, to the terminal $a$.

The emitter of transistor $T_6$ in the first stage A is connected to the emitters of transistors $T_8$ and $T_{10}$ of the following stages B and C, and is connected through the junction or point $P_3$ and the resistor $R_{24}$ to the terminal $a$. The collectors of transistor $T_5$ and $T_7$ except that at the last stage C are connected to the negative pole of the battery. The collectors are also coupled through the resistors $R_{14}$, $R_{19}$ and the capacitors $C_2$ and $C_3$ to the point $P_2$, and from there through the resistor $R_9$ to the terminal $a$. The collectors of transistors $T_5$ and $T_7$ are also connected from the junctions $P_1$ of the respective resistors $R_{14}$, $R_{19}$ and the capacitors $C_2$, $C_3$, through the resistors $R_{18}$ and $R_{23}$ to the bases of transistors $T_8$ and $T_{10}$ at the following stages.

The point $P_3$ is connected to the collector of a transistor $T_3$, the emitter of which is connected to the negative pole and the base of which is connected through the resistor $R_7$ to the point $P_7$. The terminal $b$ is connected to the flasher relay (not shown). The lamps $L_1$, $L_2$ and $L_3$ are successively turned on to operate as a flasher when the electric signal for the flasher use is applied to the said terminal $b$. The latter is connected to the emitter of transistor $T_1$, the base of which is connected from the junction or point $P_{11}$ through the resistor $R_{25}$ to the terminal $a$ and the said point $P_{11}$ is connected through resistor $R_{26}$ to the negative pole. The collector of the said transistor $T_1$ is connected to the point $P_4$ which is connected through the resistor $R_8$ to the base of transistor $T_2$ and is also connected through the resistor $R_5$ to the point $P_5$ which is connected to the junction $P_6$ and through the resistor $R_6$ to the negative pole. The junction $P_6$ is connected through the forward direction of diode $D_3$ to the junction $P_7$ and through the diode $D_2$ to the point $P_8$.

The point $P_8$ is connected through the smoothing circuit comprising the resistor $R_4$ and the capacitor $C_1$ to the negative pole and is also connected through the resistor $R_3$ to the base of transistor $T_4$.

A terminal $c$ is connected to the stop switch (not shown) which is actuated by stepping on the brake, to turn on the lamps $L_1$, $L_2$ and $L_3$ simultaneously.

The terminal $c$ is connected through the resistor $R_1$ to a junction $P_{10}$ which is connected through the resistor $R_2$ to the negative pole and to the point $P_9$. The point $P_9$ is connected through the ordinary direction of the diode $D_1$ to the point $P_7$.

The circuit operates, when the terminal $a$ is connected to the power, as follows:

I When the signal of the direction indicator is provided from the terminal $b$, the signal is applied from the emitter of transistor $T_1$ to conduct the transistor $T_2$ through the resistor $R_8$ and to cause flow of base current of the transistor $T_3$ through the resistor $R_5$, the ordinary direction of the diode $D_3$ and the resistor $R_7$. This operates the circuit to turn on the lamps $L_1$, $L_2$ and $L_3$ sequentially. Specifically, current flows from the resistor $R_5$ to the diode $D_2$ and causes conduction of the transistor $T_4$ by means of the smoothing circuit comprising the resistor $R_4$ and the capacitor $C_1$. The pulse signal of the direction indicator from the terminal $b$ is smoothed by means of the circuit. The latter applies the current to the base of the said transistor $T_4$.

Further, when the current flows from the resistor $R_{10}$ connected to the terminal $a$ to the base of transistor $T_6$, the base current of transistor $T_5$ flows to elevate the collector potential of the said transistor $T_5$ and the base current of transistor $T_6$ flows more and more through the resistor $R_{13}$. Due to this positive feed back the collector potential of transistor $T_5$ rises to the extent substantially equal to the battery voltage rapidly to conduct the lamp $L_1$.

At this time the capacitor $C_2$ begins to be charged through the resistor $R_{14}$ and the electric charge is accumulated across the capacitor. When the potential at point $P_1$ rises to an extent where the current flows through the resistor $R_{18}$ to the transistor $T_8$ of amplifying circuit at the following stage B, the similar positive feed back as stated above is caused to conduct the lamp $L_2$ at the said stage B. Thus the lamp $L_2$ is driven successively as the load at the following stage.

Thus when the current flows through the resistor $R_{23}$ to the base of transistor $T_{10}$ at the last stage C, the current flows to the base of transistor $T_9$ and the collector potential rises to provide the positive feed back and the said collector potential rises to an extent substantially equal to the battery voltage to turn on the lamp $L_3$.

As the respective emitters of transistors $T_6$, $T_8$ and $T_{10}$ are connected through the resistor $R_{24}$ to the emitters of transistors $T_5$, $T_7$ and $T_9$, when the signal at $b$ ceases the emitter potential of the former transistors and that of the latter become equal to each other. Thus current does not flow to the resistors $R_{12}$, $R_{16}$, $R_{21}$ and the resistors $R_{13}$, $R_{17}$, $R_{22}$ thereby effecting the cut off of the transistors $T_5$, $T_7$, $T_9$ and the transistors $T_6$, $T_8$, $T_{10}$ and resulting in the simultaneous cut off of the load lamps $L_1$, $L_2$ and $L_3$.

When the successive signal is applied to the terminal $b$, the said operation is repeated.

II. When the brake signal is applied from the terminal $c$, the voltage divided by the resistors $R_1$, $R_2$ is impressed to the transistor $T_3$ thereby causing flow of base current through the resistor $R_7$ to render the transistor $T_3$ conductive. In this case the operation is similar to that in the above mentioned (I) but differs to some extent in the fact that the transistor $T_2$ is not rendered conductive. Thus there is no time constant circuit to cause the time difference at each stage comprising the resistor $R_{14}$ connected to the collector of the transistors $T_5$ and $T_7$ and the capacitors $C_2$ and $C_3$, so the lamps $L_1$, $L_2$ and $L_3$ are all turned on and cut off simultaneously.

III. When the direction indicating signal is c, from the terminal b and simultaneously the brake signal is applied from the terminal c., the current flows from the emitter of transistor $T_1$ through its collector, resistor $R_5$, diode $D_2$ and the smoothing circuit $R_4$ and $C_1$ to the base of transistor $T_4$ by means of the signal from the terminal b and the said transistor remains conductive. Thus the signal from the terminal c is grounded through the collector and the emitter of the said transistor $T_4$.

As a result the signal from the terminal b takes priority and the operation becomes equal to that in (I) described above, thereby repeating to render the lamps $L_1$, $L_2$ and $L_3$ conductive in sequence and to cut off the current simultaneously. The diode $D_1$ prevents shorting at the point $P_7$ when the transistor $T_4$ conducts in response to the signal applied from the terminal b; the diode $D_2$ is to prevent the transistor $T_3$ from being affected by the smoothing circuit $R_4$ and $C_1$; and the diode $D_3$ is to avoid giving the signal from the terminal c to the transistor $T_4$ and $T_2$.

Referring now to another embodiment shown in FIG. 2 the turning on the circuit comprising the transistors $T_5$, $T_6$; $T_7$, $T_8$; $T_9$, $T_{10}$ and the lamps $L_1$, $L_2$ and $L_3$ and the circuit composition comprising the transistors $T_1$, $T_2$ and $T_3$ is accomplished in the similar manner to the circuit in FIG. 1 above.

When the signal of direction indicator is applied from the terminal b, the signal is provided from the emitter of transistor $T_1$, remaining conductive, and energizing the transistor $T_2$ through the resistor $R_8$.

Further the base current flows through the diode $D_3$ and by way of the resistor $R_7$ to the transistor $T_3$ and the turn on circuit causes conduction through the lamps $L_1$, $L_2$ and $L_3$ in order.

On the other hand when there is no signal from the terminal c and the brake signal is applied from the terminal c, the current flows through the emitter and the base of transistor $T_4$ to the resistor $R_3$. This raises the collector potential of transistor $T_3$ to flow the current from the diode $D_1$ through the resistor $R_7$ to the base of transistor $T_3$.

In this case, there is no signal applied from the terminal b and the transistor $T_2$ is not rendered conductive, so the respective time constant circuits $R_{14}$, $C_2$ and $R_{19}$, $C_3$ provided at A and B stages do not operate. Accordingly the lamps $L_1$, $L_2$ and $L_3$ conduct simultaneously. This is also caused by the fact that the diode $D_3$ does not give the affect of brake signal to the transistor $T_2$.

When the direction indicating signal is applied from the terminal b and the brake signal from the terminal c simultaneously, the signal from the terminal b turn-on the transistor $T_2$ from the transistor $T_1$ through the resistor $R_8$. The base current flows to the transistor $T_3$ through the ordinary direction of diode $D_3$ and the resistor $R_7$ to turn on the lamps $L_1$, $L_2$ and $L_3$ in order.

At the same time, the current flowing through the resistor $R_5$ flows to the smoothing circuit comprising the resistor $R_4$ and the capacitor $C_1$ through the diode $D_2$, and short circuits the brake signal applied from the terminal c to cut off the brake signal by means of the transistor $T_4$.

As a result when the signals are applied simultaneously from the terminal b and c, the direction indicating signal from the terminal b takes priority. This is also caused by the fact that the diode $D_2$ does not cause the smoothing circuit to affect transistor $T_2$, and the diode $D_1$ does not provide the back voltage to the transistor $T_4$.

Referring now to FIG. 3 which shows another embodiment, the bases of transistors $T_5$, $T_7$ and $T_9$ have their emitters connected to the power supply terminal a. They are connected through the resistors $R_{12}$, $R_{16}$ and $R_{21}$ to the collectors of transistors $T_6$, $T_8$ and $T_{10}$. The collectors of transistors $T_5$, $T_7$ and $T_9$ are connected through the resistors $R_{13}$, $R_{17}$ and $R_{22}$ to the bases of transistors $T_6$, $T_8$ and $T_{10}$ and also the base of the transistor at the first stage A is connected through the resistor $R_{10}$ to the power supply terminal a.

The emitter of transistor $T_6$ at the first stage A is connected to each emitters of transistors $T_8$ and $T_{10}$ at the respective following stages, and is also connected through the joint $P_3$ and the resistor $R_{24}$ to the terminal a.

The collectors of transistors $T_7$ and $T_9$, excepting the transistor $T_9$ at the first stage C, are connected through the loads $L_2$ and $L_3$ of each circuit to the negative pole of the battery. The collectors of transistors $T_5$ and $T_7$ are connected through the resistors $R_{14}$, $R_{19}$ and the capacitors $C_2$, $C_3$ to the point $P_2$.

The point $P_1$ of the resistors $R_{14}$, $R_{19}$ and the capacitors $C_2$, $C_3$ is connected through the resistors $R_{18}$, $R_{23}$ to the bases of transistors $T_8$ and $T_{10}$ respectively at the following stages B and C.

The point $P_3$ is connected to the collector of transistor $T_4$ the emitter of which is connected to the negative pole and the base of which is connected through the resistor $R_7$ to the point $P_4$.

On the other hand the collector of transistor $T_1$ the base of which is connected to the point $P_{11}$ of resistors $R_{25}$ and $R_{26}$ is connected to the said point $P_4$.

The point $P_5$ of the resistors $R_5$ and $R_6$ is connected through the ordinary direction of diode $D_5$ to the point $P_8$, which is connected to the negative pole through the smoothing circuit comprising the resistor $R_4$ and the capacitor $C_1$ and further is connected to the base of transistor $T_2$. The collector of the transistor $T_2$ is connected at the point $P_9$ to the line connecting the base of transistor $T_3$ to the point $P_{10}$ at which the resistor $R_2$ is connected with the resistor $R_1$ which is connected to the terminal c.

The point $P_{12}$ between the collector of transistors $T_6$, $T_8$ and $T_{10}$ and the resistors $R_{12}$, $R_{16}$ and $R_{21}$ are connected through the ordinary direction of diodes $D_1$, $D_2$ and $D_3$ to the point $P_{13}$ on the lead 1 from the collector of transistor $T_3$.

Moreover the diode $D_4$ connected between the points $P_{14}$ and $P_{15}$ is provided in order not to apply the back voltage of the transistors $T_6$, $T_8$ and $T_{10}$ by energizing the transistor $T_3$.

Referring to the operation, when the direction indicating signal is applied from the terminal b, the current flows to the base of transistor $T_4$ through the transistor $T_1$ and the resistor $R_7$. In other words the turn on circuit works to conduct the lamps $L_1$, $L_2$ and $L_3$ in order.

The direction indicating signal from the said transistor $T_1$ flows the base current through the resistor $R_5$ and the diode $D_5$ to the transistor $T_2$ to remain conductive.

In this case if the brake signal is also applied from the terminal c, it is shorted by means of the transistor $T_2$. In other words it does not connect the base current to the transistor $T_3$. On the contrary, if only the brake signal is applied from the terminal c, it causes flow of base current through the resistor $R_1$ to the transistor $T_3$ to keep it conducting and the lead 1 exhibits potential. In this case, the current flows from the battery terminal a to the base of transistor $T_5$ through the resistor $R_{12}$ and the diode $D_1$. In other words, the current flows from the terminal a to the lamp $L_1$ through the transistor $T_5$. Also the base current of transistor $T_7$ flows through the resistor $R_{16}$ and the diode $D_2$ to conduct the lamp $L_2$. In the same manner the base current of transistor $T_9$ flows through the resistor $R_{21}$ and the diode $D_3$ to turn on the lamp $L_3$. In other words by applying the brake signal from the terminal c the lamps $L_1$, $L_2$ and $L_3$ at respective stages A, B and C can be turned on simultaneously. In this case if the signal is applied from the terminal b, it flows through the resistor $R_5$ and the diode $D_5$ to smooth by means of the resistor $R_4$ and the capacitor $C_1$ and to cause conduction of the transistor $T_2$ thereby causing the base and the emitter of transistor $T_3$ to keep the same potential in order not to render the transistor $T_3$ conductive. As a result when the brake signal is applied the lamps $L_1$, $L_2$ and $L_3$ are all turned on simultaneously, and in this case if the direction indicating signal is applied, it does not work as a brake lamp but flashes as a direction indicator.

As described above, this invention uses a conventional brake lamp and direction indicating lamp in combination and selects one of them. Even if the direction indicating lamp is turned on at one side and the brake lamp is turned on at the other side, it can make the cars behind as well as the cars ahead aware of the activity of this car. Furthermore, the circuit serves the brake and the direction indicator, but has the actual merits of a simple circuit.

What is claimed is:

1. A signalling system for a vehicle having signal lamps and respective means to produce a brake signal and a direction indicating signal, comprising lamp turn-on means having lines adapted to be connected to respective lamps for applying signals to the lines simultaneously, time constant means connectable to said turn-on means for constraining said turn-on means to apply the signals to the lines sequentially rather than simultaneously, first circuit means responsive to the indicating signal for connecting said time constant means to said turn-on means and causing said turn-on means to coact with said time constant means, second circuit means responsive to the brake signal for actuating said turn-on means and avoiding said time constant means, and third circuit means responsive to said direction indicating means for rendering said second circuit means ineffective when said brake signal and said direction indicating signal are applied simultaneously.

2. A signalling system for a vehicle having a plurality of signal lamps and respective means to produce a brake signal on one line and a direction indicating signal which is composed of a sequence of electrical voltages on another line, comprising: lamp turn-on means having terminals adapted to be connected to the lamps for producing simultaneous signals at said terminals when said turn-on means is actuated, first circuit means adapted to be connected to the line carrying the brake signal for actuating said turn-on means in response to a signal on the line, time constant means adapted to be operatively connected into said turn-on means so as to cause the signals at the terminals to occur sequentially instead of simultaneously, second circuit means adapted to be connected to the line carrying the direction indicating signal for actuating said turn-on means and for connecting said time constant means into said turn-on means, energy storage means adapted to be connected to the line carrying the direction indicating signal for storing the intermittent electrical voltages during the intervals between the voltages while a direction indicating signal is applied on the line, and transistor means connected to said first circuit means and to said energy storage means and responsive to the voltage across said energy storage means for rendering said first circuit means ineffective.

3. A system as in claim 2, wherein said energy storage means includes a capacitor and diode means for applying the voltage across said capacitor.

4. A system as in claim 2, wherein said transistor means includes a transistor having an emitter-collector path connected across said first circuit means so as to connect the output of said first circuit means to ground when the emitter-collector path is conductive, and having a base responsive to said energy storage means for rendering the emitter-collector path conductive.

5. A system as in claim 4, wherein said energy storage means includes a capacitor and diode means for storing voltages across that capacitor.

6. A system as in claim 2, wherein said transistor means includes a path of major current flow for connecting the said first circuit means to said turn-on means, said transistor means having a control electrode responsive to said energy storage means.

7. A system as in claim 6, wherein said energy storage means includes a capacitor and diode means for storing the voltages across that capacitor.

8. A system as in claim 2, wherein said transistor means includes a first transistor having a main path of current flow for shunting the signal of said first circuit means to ground, and having a control electrode responsive to said energy storage means; said transistor means having a second transistor for coupling the first circuit means to said turn-on means, said first transistor being connected to said second transistor to decouple the first circuit means from said turn-on means in response to the operation of said first transistor by said energy storage means.

9. A signalling system for a vehicle comprising a plurality of signal lamps, a brake signal line for carrying a brake signal, a direction indicating line for carrying a direction indicating signal, control means connected to each said lamps for energizing said lamps when actuated, time constant means connectable into said control means for constraining said control means to light said lamps sequentially when connected and for causing said control means to light said lamps simultaneously when disconnected, first circuit means connected to said direction indicating line and said control means for actuating said control means and for connecting said time constant means into said control means, second circuit means connected to the brake signal line for actuating said control means while deactivating said time constant means with respect to said control means, and third circuit means connected to said first circuit means and said brake signal line for decoupling said brake signal line from said control means in response to a signal on the direction indicating line.

* * * * *

UNITED STATES PATENT OFFICE
CERTIFICATE OF CORRECTION

Patent No. 3,656,103      Dated April 11, 1972

Inventor(s) Hiroshi Tanaka, Shozo Naito, Tetsuji Shimizu

It is certified that error appears in the above-identified patent and that said Letters Patent are hereby corrected as shown below:

In the heading of the patent, the following should be inserted:

-- [30]     Foreign Application Priority Data

March 22, 1968   Japan..........43-22215 --

Signed and sealed this 11th day of July 1972.

(SEAL)
Attest:

EDWARD M. FLETCHER, JR.      ROBERT GOTTSCHALK
Attesting Officer             Commissioner of Patents